United States Patent [19]  [11] 4,156,742
Babcock et al.  [45] May 29, 1979

[54] METHOD OF PREPARING CORN KERNEL SNACK FOOD AND PRODUCT THEREOF

[75] Inventors: Glen E. Babcock, Peoria; James H. Sloneker, Danvers, both of Ill.

[73] Assignee: The United States of America as represented by the Secretary of Agriculture, Washington, D.C.

[21] Appl. No.: 908,602

[22] Filed: May 23, 1978

[51] Int. Cl.² ............................................. A23B 9/00
[52] U.S. Cl. ................................... 426/618; 426/438; 426/442
[58] Field of Search ............... 426/302, 309, 310, 331, 426/335, 625, 627, 629, 438, 441, 442, 460, 507, 640, 288

[56] References Cited

U.S. PATENT DOCUMENTS

| 1,097,882 | 5/1914 | Saunders | 426/450 |
| 2,219,777 | 10/1940 | Holloway et al. | 426/288 |

*Primary Examiner*—Raymond N. Jones
*Assistant Examiner*—Elizabeth A. Hatcher
*Attorney, Agent, or Firm*—M. Howard Silverstein; David G. McConnell; Curtis P. Ribando

[57] ABSTRACT

A snack food is prepared from dehulled whole corn kernels by subjecting them to an alcohol treatment prior to deep frying. The alcohol softens the kernels thereby imparting a texture thereto which is more readily acceptable than that of parched corn.

11 Claims, No Drawings

METHOD OF PREPARING CORN KERNEL SNACK FOOD AND PRODUCT THEREOF

BACKGROUND OF THE INVENTION

1. Field of the Invention

This invention relates to the preparation of an edible snack food from whole corn kernels without significantly altering their appearance or physical outer structure.

2. Description of the Prior Art

Prior art attempts to produce a snack food from field corn, or other low grade varieties, have led to a product known as parched corn. Conventionally, parched corn is prepared by dry heating or roasting whole corn kernels until they are very hard and dry. An alternate process of preparing a parched corn from either field or sweet corn is taught by Holloway et al. in U.S. Pat. No. 2,219,777. The whole dry kernels are first soaked in water at 150°-160° F. for 1 to 1½ hours in order to wet the inner kernel and protect it from the caustic. Alkali is then added to the water and the temperature raised to 170°-180° F. for about ½ hour for the purpose of removing the outer skin of the kernel. After washing off the loosened skin and draining the excess water, the kernels are parched by cooking in deep fat or oil at about 350°-400° F. for about 7 to 8½ minutes. Parched corn products prepared by either the conventional technique or that of Holloway et al. are characterized by a hard, crunchy texture, which is considered by many to be unacceptable.

SUMMARY OF THE INVENTION

We have now unexpectedly found that an edible snack food which is relatively soft as compared to parched corn can be readily prepared from dehulled whole corn kernels by subjecting the kernels to an alcohol treatment step prior to deep frying.

In accordance with this discovery, it is an object of this invention to provide a novel method of producing a snack food from whole corn kernels.

It is also an object of the invention that the method be simple, economical, and commercially feasible.

Another object of the invention is to soften the kernels while retaining the flavor, shape, and surface texture of the original corn.

A further objective is that the snack food be flavorable, nutritious, and relatively soft as compared to parched corn so as not to be injurious to either natural or artificial teeth during mastication.

Other objects and advantages of the invention will become readily apparent from the ensuing description.

DETAILED DESCRIPTION OF THE INVENTION

The starting material for use in this invention may be any *Zea mays* variety of edible corn kernels. Dent corn, waxy corn, and sweet corn are generally preferred, though others such as Indian corn, high amylose corn, and high lysine corn would also be operative.

It is necessary that the kernels be dehulled; that is, that they have the outer skin removed. The specific process of dehulling is not critical, and this step does not in itself constitute novelty within the instant invention. Any of the procedures as well known in the prior art may be used provided that it leaves the corn kernel substantially intact and does not degrade the kernel by rendering it toxic or otherwise inedible. Alkali, or lye, dehulling procedures, such as those taught in U.S. Pat. No. 2,219,777, supra, and in Marden et al., J. Ind. Eng. Chem. 7(10): 850-853, October 1915, are generally suitable. It is preferred to use a relatively strong solution (1.5-5%) of sodium or potassium hydroxide preheated to temperatures near 100° C. in order to minimize the contact time of the kernel with the alkali, and thereby minimize degradation. Under these conditions, the hulls are sufficiently loosened in about 3-5 minutes such that they may be readily removed by agitation in water. It is understood that mechanical dehullers may be used to expedite the process. After dehulling, it is preferred to wash the kernels with water to remove any remaining hulls and residual lye. The excess water is drained off, and the moisture content of the grain is then adjusted to 15-30% by dry weight of the corn, though 20-25% is preferred. Above 30% moisture, alcohol absorption in the subsequent step is unduly retarded. Below 15%, alcohol absorption is excessive, and the product tends to be hard.

As mentioned above, the relatively soft snack food of this invention is obtained by treating the dehulled corn kernels with alcohol prior to deep frying. It is preferred to use ethanol since it is nonpoisonous and residual amounts in the food product are acceptable by the FDA. However, it is understood that other lower alcohols, such as methanol, n-propanol, and isopropanol will produce the same results.

The conditions of alcohol treatment are somewhat variable depending upon the desired flavor and texture of the final product. The amount of alcohol to be absorbed by the corn is in the range of 3-25%, and preferably about 3-6% by dry weight of the corn. The alcohol may be admixed with the kernels by any conventional means such as in a rotatable drum-type sprayer, and then allowed to come to equilibrium. To obtain uniform absorption at these levels, it is preferred to first reduce the moisture content of the corn by an amount of about 2-10% below the level desired for the subsequent cooking step. The alcohol is then diluted with sufficient water to raise the moisture content back to the desired level, and the alcohol-water mixture is applied to the corn. The contact time required for absorption generally ranges from 1-2 hours at room temperature, though longer periods may be allowed. The rate of absorption varies proportionally with temperature, and temperatures in the range of about 0°-75° C. may be employed. Above 75° C., the starch begins to gelatinize, and at the upper end of the range, the lower alcohols either boil or are highly volatile and should be contained in a closed vessel.

Alternatively, the kernels can be soaked in excess alcohol approximating 25-200% or more by weight of the corn. The contact time under these conditions should be limited to about 5-120 minutes. Longer soaking periods effect the leaching of solubles from the kernels, resulting in a bland-tasting product. For each variety of corn, the properties of the final product can be varied by altering the moisture content and the amount of absorbed alcohol.

The alcohol-treated kernels are cooked by deep frying in fat or oil. It is generally preferred to use a vegetable oil such as corn oil or other commercially available cooking oil. Suitable cooking temperatures are within the range of about 130°-190° C. Above 190° C., the kernels develop an over-cooked and undesirable flavor. If a yellow product is desired, the temperature should be kept below about 140° C., above which the corn begins to discolor. For brown kernels, the temperature is preferably held within the range of 140°-180° C. It is recommended that the oil be preheated to at least about 100° C. prior to adding the alcohol-containing corn kernels. The temperature is then slowly raised to the desired level at which it is maintained until the kernels rise to the surface. They are then removed, drained of excess oil, and allowed to cool.

During cooking, the alcohol and water are vaporized and released with entrapped air into the oil in the form of bubbles. When the temperature is gradually raised from the preheated level to the point where bubbles almost cease to appear (about 175° C.), the product will be substantially free of all traces of alcohol. If it is desirable to cook at lower temperatures in order to avoid browning as discussed above, then residual alcohol may be removed from the product by means of a vacuum oven at less than 140° C.

The resultant snack food is characterized by a friable texture considerably softer than parched corn. Test results indicate an average crush resistance of 45-60% less than parched corn prepared by a similar process without the alcohol treatment, such as that of U.S. Pat. No. 2,219,777, supra. The kernels are expanded to 50-200% greater than the original size, depending upon the variety, the initial moisture and alcohol contents, and the cooking conditions. The outer appearance is smooth and glossy, and roughly the same shape as the raw corn. The snack food itself is tasty, and of course, it may be seasoned with salt, cheese, or other condiments as known in the art. Flavorants and coloring agents may also be applied to the inner and outer kernel structures by entrainment with alcohol during the alcohol treatment step.

The shelf life of the corn is a function of the stability of the cooking oil. Antioxidants and other stabilizers can be added to the oil in order to inhibit rancidity. Corn cooked in commercial oils containing antioxidants retain their fresh flavor up to about 11 weeks.

The following examples are intended only to further illustrate the invention and are not intended to limit the scope of the invention which is defined by the claims.

EXAMPLE 1

NaOH (30 g.) was dissolved in 1 liter water and brought to boiling in a 1-gallon capacity stainless-steel boiler equipped with an inner basket perforated with ¼-inch holes. Waxy corn (400 g.) (No. 325, Moews Seed Co.) was added while keeping the temperature at or near boiling. After 3 minutes, the basket of corn was removed, drenched with cool water, and washed with running water for about 1 hour to remove the pericarp and wash out the alkali. Excess water was drained off.

The dehulled corn was submerged in 95% ethyl alcohol in a covered jar and allowed to soak for 18 hours, after which it was removed from the alcohol and allowed to drain. The moisture content was reduced further by drying for 5 minutes in a hot air stream produced by an electric blow drier. The kernels were then immersed in vegetable cooking oil preheated to 150° C. in a kitchen-type electric French fryer of about 2-quart capacity. The temperature was increased to 172° C. in 10 minutes, after which the corn was removed, drained, and surface blotted with paper towels. The resultant kernels were soft, easily masticated, and had a good flavor.

EXAMPLE 2

The procedure of Example 1 was repeated except that dent corn was substituted for the waxy corn. The resultant product was slightly harder, but otherwise similar to that prepared in Example 1.

EXAMPLE 3

Dent corn (400 g.) was dehulled by the procedure of Example 1. The wet sample after draining weighed 560 g. and was divided into four 140-g. portions which were treated for 18 hours in a covered jar with various amounts of 95% ethyl alcohol and water according to the following schedule:

|   | 75% Ethyl alcohol (cc.) | Water (cc.) |
|---|---|---|
| A | 100 | 50 |
| B | 75 | 75 |
| C | 50 | 100 |
| D | 25 | 125 |

Each portion was then deep fried according to the procedure of Example 1. All four products had an acceptable texture and flavor, though sample D was perceptably harder than the others.

EXAMPLE 4

NaOH (60 g.) was dissolved in 1200 g. water and brought to boiling in the apparatus used in Example 1. Sweet corn (500 g.) was added while keeping the temperature at or near boiling. After 6 minutes, the corn was removed, washed with cool water, and drained.

The dehulled corn was divided into two equal portions, each of which was placed in a covered jar with 20 cc. ethyl alcohol. The jars were allowed to sit for 18 hours during which they were stirred occasionally by rotation. The alcohol-treated portions were recombined and immersed in vegetable cooking oil ("Wesson") preheated to 100° C. When the kernels floated to the surface of the oil and evolution of gas substantially ceased, the corn was removed, drained, and allowed to cool. The product had an excellent, sweet flavor, and excellent mouth feel.

EXAMPLE 5

NaOH (72 g.) was dissolved in 1200 cc. water and brought to boiling in the apparatus used in Example 1. "Iochief" sweet corn (400 g.) was added while keeping the temperature at or near boiling. After 6 minutes, the corn was removed, drained, washed with running water to remove the lye, and drained again. The tip caps and loosened hulls were removed by abrasion against the basket of the dehulling apparatus.

The dehulled and washed sweet corn was partially dried, placed in a lidded jar, and 20 cc. ethyl alcohol and 20 cc. water were added. After 18 hours, the corn was deep fried according to the procedure of Example 1, except that evolution of bubbles ceased at 170° C., and the corn was removed. The corn was drained in a colander and patted dry with paper towels. It had a soft friable texture and excellent flavor.

EXAMPLE 6

The purpose of this example was to demonstrate the criticality of the alcohol treatment.

Yellow dent corn (870 g.) was gleaned from a 940-g. lot identified as Yellow Dent ED 96. This was divided into two parts and dehulled by immersing each part in 2.5% aqueous NaOH preheated to boiling. After 6 minutes, the corn was removed from the alkali, drained, washed with water, and cooled. The corn was rubbed against the basket of the dehulling apparatus to remove the loosened hulls. Dehulled corn (990 g.) having a moisture content of 17% was obtained.

A. The dehulled corn (260 g.) was immersed in "Wesson" oil preheated to 100° C. The temperature of the oil was raised to 175° C. at which time the evolution of bubbles ceased, and the corn was removed and patted with paper towels to remove excess oil. This corn was labeled "sample A".

B. The dehulled corn (730 g.) was treated with 10% ethyl alcohol based on the original weight of the corn. The corn was allowed to come to equilibrium with the alcohol and immersed in "Wesson" oil preheated to 100° C. The temperature of the oil was raised to 175° C. at which time the evolution of bubbles substantially ceased, and the corn was removed and patted with paper towels to remove excess oil. This corn was labeled "sample B".

The crush resistance of samples A and B was tested in a device constructed to simulate the action of molars on corn kernels. The device comprised a metal base above which was mounted a metal plunger supported in a guide tube and affixed to the underside of a pan. In testing, a corn kernel was placed between the base and plunger, and the pan was gradually loaded with weights in 100-g. increments until the kernel was abruptly crushed. Ten randomly selected kernels from each of samples A and B were tested, and the results are reported in the table below. The reported values include the weights of the plunger and pan.

| Kernel number | Crush load (g.) | |
|---|---|---|
| | Sample A (no EtOH) | Sample B (EtOH-treated) |
| 1 | 4954 | 1183 |
| 2 | 6954 | 4683 |
| 3 | 5504 | 5767 |
| 4 | 13004 | 2046 |
| 5 | 7654 | 3446 |
| 6 | 2935 | 4546 |
| 7 | 5535 | 5546 |
| 8 | 8835 | 4146 |
| 9 | 11835 | 4846 |
| 10 | 8235 | 4046 |
| Average | 7545 | 4026 |

It is understood that the foregoing detailed description is given merely by way of illustration and that modification and variations may be made therein without departing from the spirit and scope of the invention.

We claim:

1. A method for preparing a snack food from dehulled whole corn kernels comprising treating said kernels with a lower alcohol whereby an amount of alcohol in the range of 3–25% by dry weight of the kernels is absorbed by the kernels, and thereafter cooking said alcohol-treated kernels by deep frying in a fat or oil medium at a temperature within the range of about 130°–190° C. until said kernels float to the surface of said deep frying medium.

2. The method as described in claim 1 wherein said corn is selected from the group consisting of dent corn, waxy corn, sweet corn, Indian corn, high lysine corn, and high amylose corn.

3. The method as described in claim 1 wherein, prior to said alcohol treatment, said dehulled corn kernels have a moisture content in the range of 15–30% by dry weight of the kernels.

4. The method as described in claim 1 wherein said alcohol is selected from the group consisting of methanol, ethanol, n-propanol, and isopropanol.

5. The method as described in claim 4 wherein said alcohol is ethanol.

6. The method as described in claim 1 wherein said amount of alcohol is in the range of about 3–6% by dry weight of the kernels.

7. The method as described in claim 1 wherein water is admixed with said alcohol in said alcohol treatment step.

8. The method as described in claim 1 wherein said alcohol is sprayed onto said corn.

9. The method as described in claim 1 wherein said corn is soaked in an excess of said alcohol.

10. A corn food product prepared by the process of claim 1.

11. A corn food product prepared by the process of claim 5.

* * * * *